United States Patent [19]

Chang

[11] Patent Number: 4,500,955
[45] Date of Patent: Feb. 19, 1985

[54] FULL WORD CODING FOR INFORMATION PROCESSING

[75] Inventor: Ifay F. Chang, Chappaqua, N.Y.

[73] Assignee: International Business Machines Corporation, Armonk, N.Y.

[21] Appl. No.: 336,193

[22] Filed: Dec. 31, 1981

[51] Int. Cl.³ .............................................. G06F 3/14
[52] U.S. Cl. .................................................. 364/200
[58] Field of Search ............................. 340/347 DD; 364/200 MS File, 900 MS File, 300, 710

[56] References Cited

U.S. PATENT DOCUMENTS

| 3,644,898 | 4/1970 | Post | 340/172.5 |
| 3,731,278 | 2/1970 | Eldridge et al. | 340/172.5 |
| 3,892,915 | 12/1973 | Budworth et al. | 178/21 |
| 3,980,994 | 9/1976 | Ying | 364/200 |
| 3,995,254 | 7/1975 | Rosenbaum | 340/146.3 WD |
| 4,041,467 | 11/1975 | Cota et al. | 364/900 |
| 4,158,236 | 6/1979 | Levy | 364/900 |
| 4,159,536 | 6/1979 | Kehoe | 364/900 |
| 4,193,119 | 3/1977 | Arase et al. | 364/900 |
| 4,389,636 | 6/1983 | Riddle | 340/347 DD |

OTHER PUBLICATIONS

IBM Technical Disclosure Bulletin, vol. 19, No. 9, Feb. 1977, to D. Wild, "Dynamic Message Coding", pp. 3594-3595.

Primary Examiner—Raulfe B. Zache
Assistant Examiner—David Y. Eng
Attorney, Agent, or Firm—J. F. Villella, Jr.

[57] ABSTRACT

Words input to an information processing system character-by-character are given unique unitary representations independent of alphanumeric content and order. A user selects a particular vocabulary set containing the unique unitary representations of each word in the vocabulary set. When a word is input into the system, it is matched with its unique unitary representation. This representation is provided to storage and output devices in the system. It is also utilized in text transmission. Words not found in the preselected vocabulary set are encoded character-by-character. Vocabulary sets may be chosen so as to minimize the occurrence of this last event.

3 Claims, 5 Drawing Figures

FULL WORD CODING FOR INFORMATION PROCESSING

DESCRIPTION

1. Technical Field

This invention relates to information handling systems capable of translating whole words into unique unitary terms representative of such words.

2. Background Art

State of the art word processing systems are character code based. In such systems, words are input to the system character-by-character. The individual characters are then coded and it is these coded representations that are processed by the system. The character coded representations may be acted upon in various ways; e.g., stored or transmitted to such output devices as printers or displays.

For example, the 7 bit ASCII code can represent $2^7$ or 128 characters with each character coded by a unique 7 bit representation. Thus, a five character placed in data storage requires 35 bits of information. In text transmission, a start bit, a stop bit, and an even parity bit for error detection are normally added to the character code for each character. Thus, that same five character word requires $5 \times 10$, or 50, bits of information when it is transmitted.

A system in accordance with the present invention wherein whole words are directly coded as unitary words rather than the conventional approach of coding each of the characters that make up the particular alphanumeric word will reduce storage space and decrease text transmission time. For example, for a vocabulary set containing N words, one can code the N words with a binary code have $\log_2 N$ bits. A choice of 14 bits per word results in a vocabulary set of $2^{14}$ or 16,384 words. Since each word in the vocabulary set consists of 14 bits regardless of the character count of the word, a significant reduction in storage space can be realized using this coding technique. A reduction will also be realized in text transmission time.

The stenotyping field contains examples of coding the stenographic representation of whole words or portions of words. However, whole word encoding is not suggested from the stenographic art patents. The primary purpose of storage in the stenographic art is the storage of the stenographic representations of the words and not the words themselves. U.S. Pat. No. 3,731,278 discloses a computer interfacing device which converts data in a form similar to that used in phonetic word construction of the kind generated by a shorthand machine into a computer compatible format. The computer word formed from each data input interval contains 32 bits. Similar coding techniques are disclosed in U.S. Pat. No. 3,892,915 and U.S. Pat. No. 4,041,467. However, none of these references discloses coding on a word-by-word basis with a unique representation for each whole word. Rather, they code by providing representations for either the stenographic character making up the word or the phonetic element making up the word.

SUMMARY OF THE INVENTION

Accordingly, it is an object of this invention to provide an improved full word coding technique for an information processing system.

It is another object of this invention to provide an information processing system that operates on unique unitary representations of inputted alphanumeric words.

It is another object of this invention to provide an information processing system wherein whole alphanumeric words are directly encoded into unique unitary representations of the inputted alphanumeric words.

It is still another object of this invention to provide an information processing system wherein words not represented in a chosen vocabulary set are coded a character at a time where each character is coded as a word.

It is a further object of this invention to reduce data storage requirements and increase transmission speed capabilities in an information processing system.

Still another object of this invention is to provide a word code based system that is compatible with state-of-the-art character input devices.

DISCLOSURE OF INVENTION

The present invention relates to an information processing system wherein whole words are directly encoded into unique unitary representations. These unique unitary representions are then used in text storage and text transmission.

Alphanumeric words are input character-by-character. A unique unitary representation is accorded each word by a tree search logic. Each selected vocabulary set has a unique tree associated with it and each character in the tree has a unique location in that tree. When a word is input to the system, it can be given only one unitary representation. Words that are not contained in a given vocabulary set are coded character-by-character with each character being coded as a word. Vocabulary sets are chosen so that the probability of this event occurring is very small.

BEST MODE FOR CARRYING OUT THE INVENTION

Figure 2:
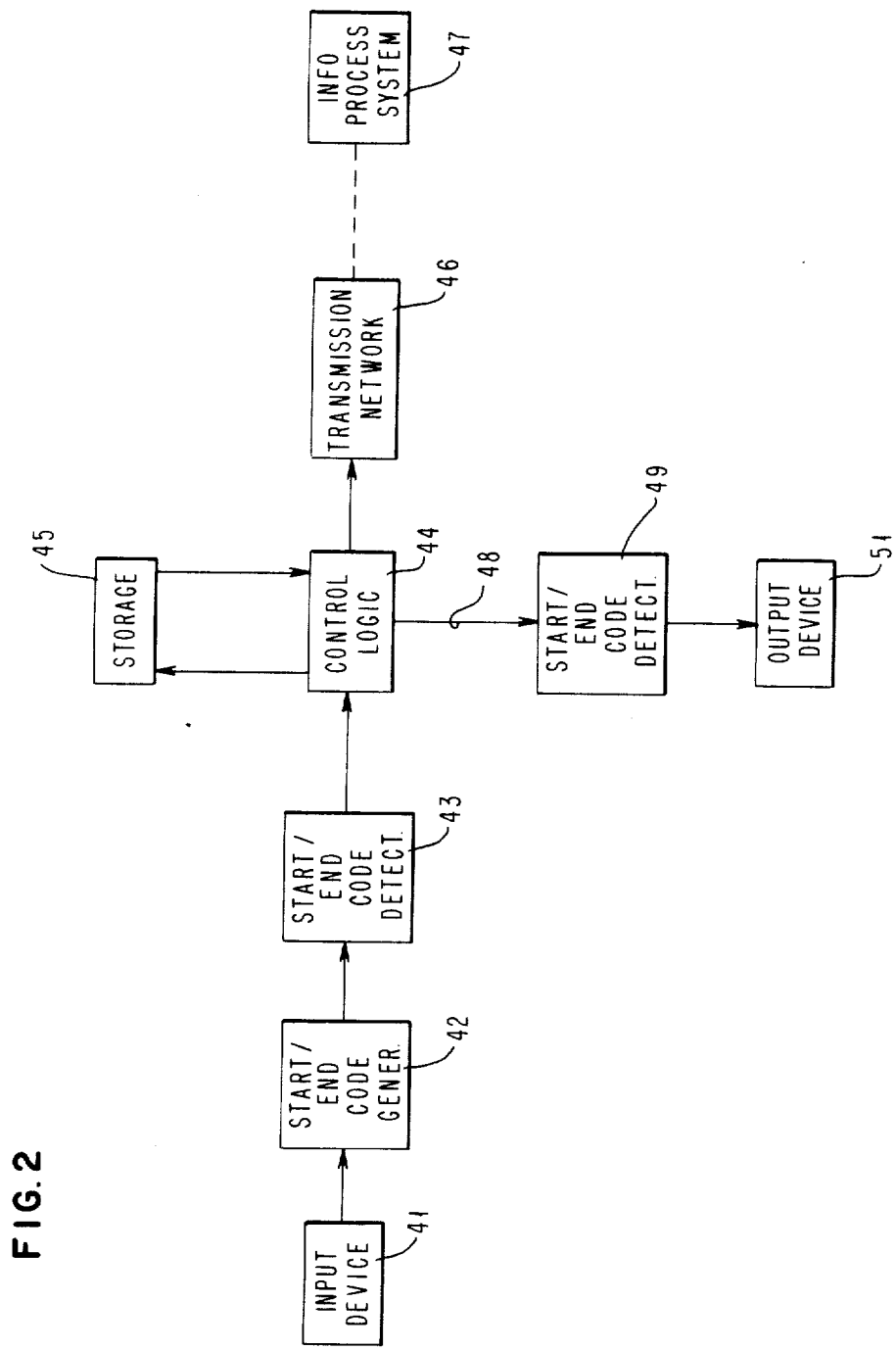
FIG. 2 is a block diagram of a state-of-the-art word processing system.

FIG. 2 illustrates a state-of-the-art word processing system. Words are input to the system character-by-character from input device 41. The input device typically includes a keyboard to either a typewriter or a computer terminal. Input device 41 may also be a light pen coupled with a CRT display or a resistive tablet coupled with a sensing pen. Data is input to the system by touching the light pen to the appropriately selected symbol on the CRT or by touching the sensing pen to the appropriately selected or desired symbol on the resistive tablet. No matter which input device is used, the mode of data entry consists of entering information into the system on a character-by-character basis. Further, alphanumeric words are represented by the serial aggregation of the representations for each symbol in the word.

A word is defined here as an alphanumeric character or combination of alphanumeric characters which symbolize and communicate a meaning without being divisible into smaller units capable of independent use. So, for example, the numeral "8", the chemical symbol for water "$H_2O$", the symbol for a question mark "?", and the term "come" are all examples of words as defined herein.

Input device 41 does not transmit the actual alphanumeric character input but rather some representation for that alphanumeric character. Typically, this representation is binary. A typical code used to represent the individual alphanumeric characters is the 7 bit ASCII code. Using the 7 bit ASCII code, $2^7$ or 128 characters can be coded with a unique 7 bit representation. Thus each alphanumeric character and each control character on a keyboard is represented by a unqiue 7 bit representation. Each word input to the system is then represented by the serial aggregation of the representations for each character in the word. Using this 7 bit code for example, the word "come" would be represented as "0000011000111100011010000101" if the individual letters had the binary representations as shown below:

| C | 0000011 |
|---|---|
| O | 0001111 |
| M | 0001101 |
| E | 0000101 |

Start/end code generator 42 delimits each whole word by placing a start bit at the beginning of the word and an end bit at the end of each whole word. The start and end codes are necessary to distinguish individual words which are being serially input into the system.

Start/end code detector 43 detects the start and end bits for each word, and signals control logic 44 accordingly that it is about to receive a whole word. Depending on the control function that the user has selected, each word received by control logic 44 may either be sent to storage 45, to transmission network 46 for transmission to information processing system 47, or may be sent out along line 48 to start/end code detector 49 and subsequently to output device 51. Words sent to storage 45 may be later retrieved for such purpose as editing and/or deletion by the user. Output device 51 may be a printer or display terminal, such as a CRT or plasma display. Information processing system 47 may have its own associated storage and output devices.

Figure 1:
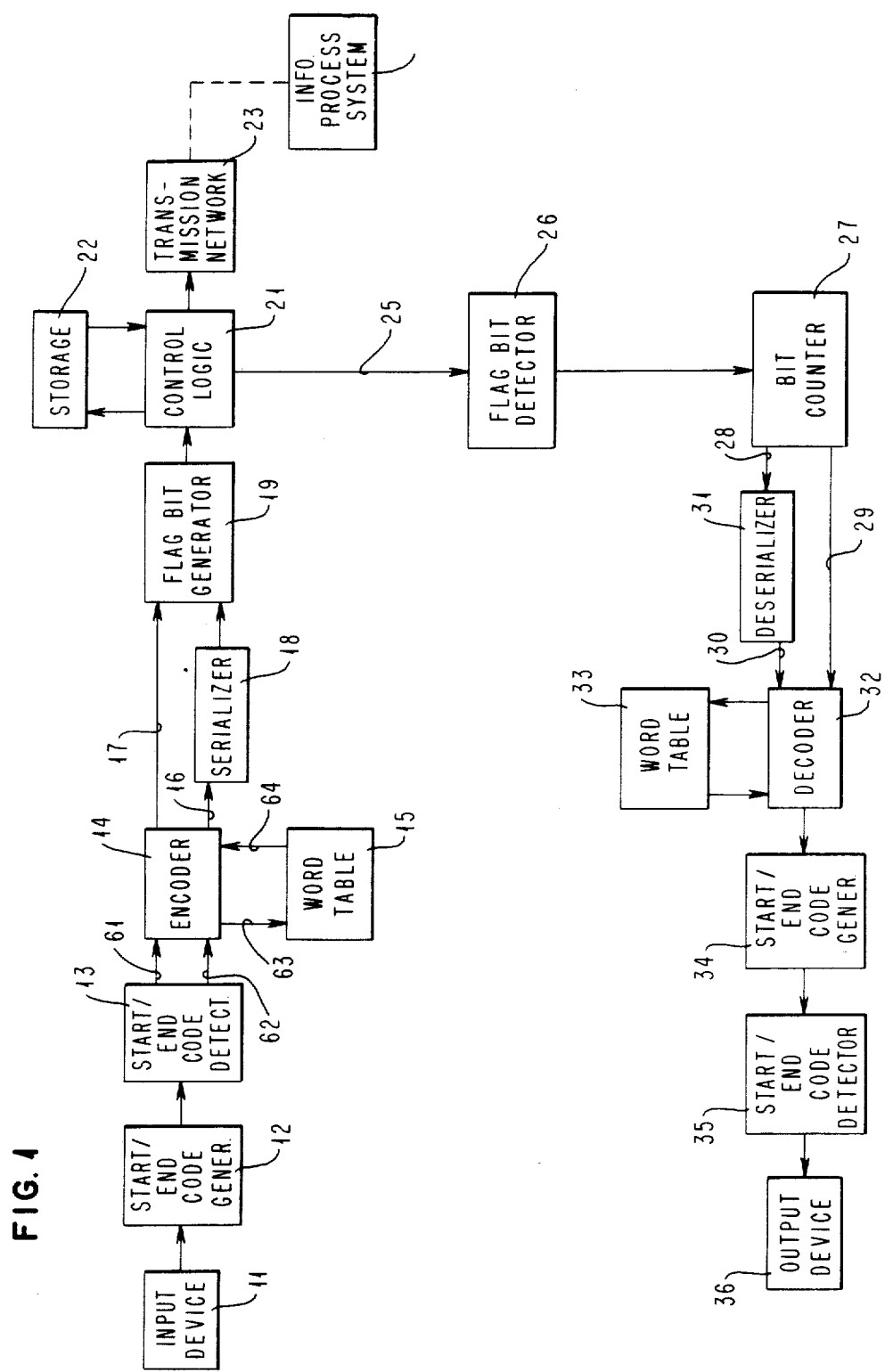
FIG. 1 is an overall block diagram of a word processing system practicing the claimed invention.
Figure 4:
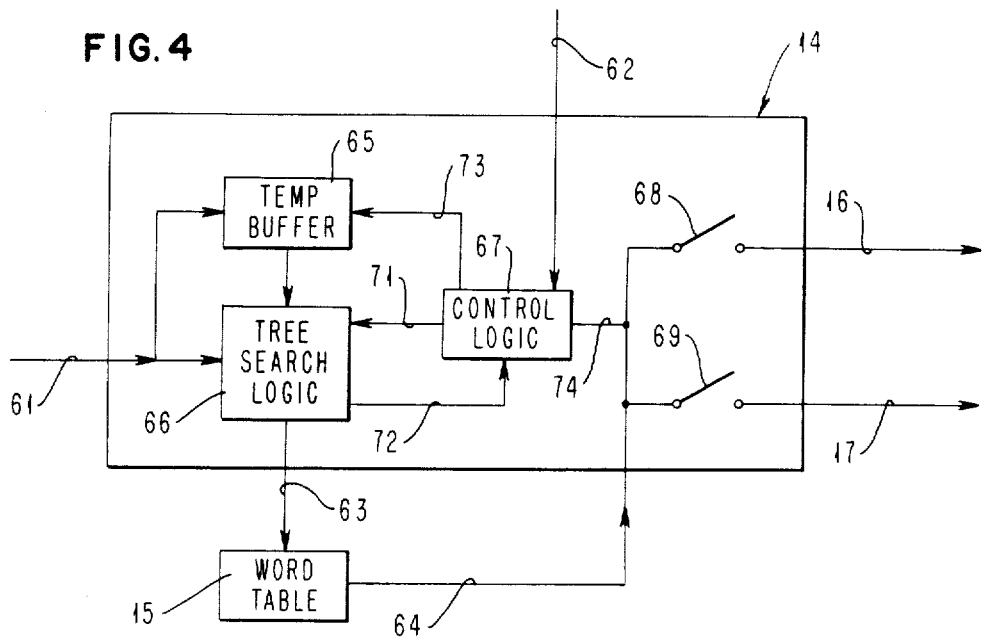
FIG. 4 is a detailed block diagram of the encoder used in the encoding portion of the system.

The preferred embodiment of the present invention is illustrated in FIG. 1. Words are input to the system character-by-character by input device 11. Start/end code generator 12 then marks each whole word with a start and an end bit. Start/end code detector 13 then delimits each whole word in the serial bit stream. Each whole word is sent to encoder 14 over line 61. Start/end code detector 13 also supplies a gating signal to encoder 14 over line 62. This gating signal indicates to the encoder that a word is being sent. The operation of encoder 14 and word table 15 will now be explained in more detail with reference to FIG. 4.

Words input to encoder 14 (FIG. 4) over line 61 (see also FIG. 1) are directed towards temporary buffer 65 and tree search logic 66. Simultaneously with the input of the word on line 61, a gating signal is input over line 62 to control logic 67. This signal indicates the beginning and end of a word. The gating signal is then relayed to tree search logic 66 over line 71. This signal first directs the tree search logic to begin searching and, second, indicates to the tree search logic 66 when the searching should be halted.

Figure 3:
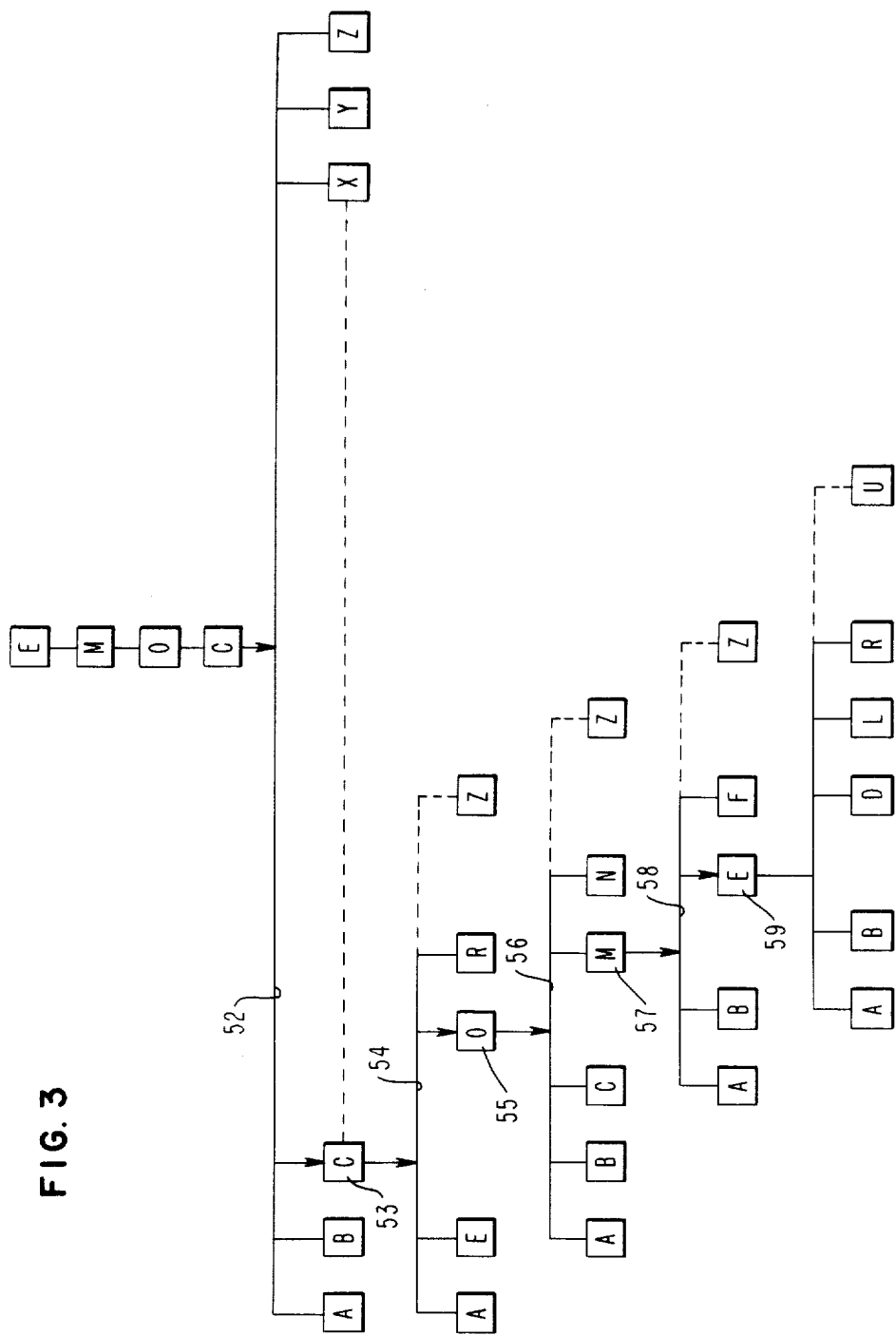
FIG. 3 is an illustration of the encoding tree of the preferred embodiment.

The operation of tree search logic 66 will now be explained in more detail using the logic tree of FIG. 3. As an illustration, the word "come" is input serially to the tree search logic. The first level 52 of the tree is searched until the character "c" is located. This occurs at position 53. The next step is to search the second level 54 until the character "o" is located on that level. This occurs at position 55 in the tree. Next, the third level 56 is searched until the third character in the word "m" is found at location 57. Finally, the fourth level 58 of the tree is searched until the last character in the word "e" is found at location 59. Corresponding to location 59 in the word tree is a location in word table 15 (see also FIG. 4). This location in the word table contains the unique representation for the whole word "come".

A comparison is made between each character input to the system and each position on a given level of the word tree. This comparison is accomplished by circuitry within tree search logic 66. Each position on the tree is represented by the 7 bit ASCII code representation for its corresponding alphanumeric character. When the first character of a word is input to the tree, tree search logic 66 directs the comparison circuitry to make a comparison between the ASCII code representation for this character and all the ASCII code representations on the first level 52 of the tree. When a hit occurs, the first letter on the tree has been found. In the example above, this occurs at position 53. At this point, tree search logic 66 directs the comparison circuitry to the first level immediately under the first selected position 53. Here, that is level 54. Once again, level 54 is searched until a hit occurs. This process continues until either the inputted word has been found on the tree or until control logic 67 signals to stop searching. As previously indicated, a gating signal is sent over line 62 to control logic 67 to indicate the beginning and end of a word. A predetermined time after the end of a word has been indicated, control logic 67 signals tree search logic 66 to halt searching. At this time, temporary buffer 65 is cleared and the input of the search logic 66 is reset to await the input of the next word.

Each position in word table 15 has a unique location in the word tree logic. The only way that the position in the word table 15 representing the word "come" can be reached is to input "come" into the word tree logic. If the word "come" is mistakenly entered as "cmoe", then location 59 on the tree is not reached and correspondingly, the address location corresponding to that location in the word table is also not reached. Each position in the word tree has its own unique next descending level associated with it. The only way to search that level is through that particular location in the tree immediately above the level. The only way to locate a word in word table 15 is to correctly enter the alphanumeric content and order of that word into the word tree.

The contents of word table 15 are predetermined by the user. In the preferred embodiment of this invention, 14 bits are used to represent each whole word in the word table. In this manner, $2^{14}$ or 16,384 words can be represented. Included in each word table is a 14 bit representation for each alphanumeric character and each control character capable of being input into the system. The word table chosen for a given user can be optimized to that user. For example, the vocabulary set chosen by a chemist would be quite different from the one chosen by an attorney.

As previously indicated, a gating signal is sent over line 71 (see FIG. 4) from the control logic to the tree search logic to indicate the input of the word to the tree search logic. Likewise a gating signal is sent across line 71 to indicate the end of a particular word that is input to the tree search logic. Whenever a word is input to the tree search logic 66 which is not located on the tree and hence not in word table 15, then a signal is sent from tree search logic 66 over line 72 to control logic 67. This signal indicates to control logic 67 that no representation for the inputted word has been found. When the second signal is sent over line 71 indicating the end of the word, a latch (not shown) is set in the tree search logic. When the inputted word is found on the tree, the latch is reset and the address of the word in the word tree is sent to the word table. However, when the word tree is not found on the tree within a predetermined time after the latch in the tree search logic is set, then a signal is sent over line 72 to control logic 67 to indicate that no word has been found on the tree. When this occurs, a signal is sent from control logic 67 over line 73 to temporary buffer 65 which contains the word initially inputted over line 61. The control logic then directs temporary buffer to send one character at a time from the contents of that buffer to the tree search logic. The start and end signals corresponding to the beginning and end of a word are then sent over line 71, to the tree search logic for every character input to the tree search logic from the temporary buffer. In this manner, each of the characters making up the word are found on level 52 (see also FIG. 3) of the tree, corresponding to a unique location in word table 15. When a word must be coded character-by-character, the representation for that word is the product of 14 bits and the number of characters contained in that word. So, for example, if the word "come" were not located in the word table, then 56 bits of information would be required to represent that word. Proper selection of the words in the word table can minimize the probability of having to individually character code inputted words.

All whole word representations are output from word table 15 over line 64. Fourteen bit representations are output for words that are located in the table, while 14 bit representations for each character in a word not located in the table are also output over line 64. However, control logic 67 governs whether the outputted representation exits encoder 14 over line 16 or 17. Switch 69 is normally in the closed position and it is over line 17 controlled by switch 69 that representations of words found in the word table are sent. Normally open switch 68 controls line 16 over which representations of words not found in the word table are sent. However, when a signal is sent from control logic 67 over line 73 to temporary buffer 65 indicating that the word inputted over line 61 has not been found in the tree search logic 66, then a signal is sent over line 74 to effect opening switch 69 while closing switch 68. In this manner, representations of words found in the word table 15 are sent over line 17 while representations of words not found in the word table, and hence coded a character at a time, are sent over line 16.

The representations of the characters for a given word sent over line 16 are input to serializer 18 (see FIG. 1) where the individual characters bits are serialized to represent an entire word. Accordingly, for example, if the word "come" is not located in the word tree, then four 14 bit representations for the characters "c", "o", "m" and "e" are sent over line 16 to serializer 18. At this time, the four 14 bit representations are serially aggregated into a 56 bit representation for the word "come". This 56 bit representation is then input to flag bit generator 19 which attaches a flag bit at the beginning of the representation to indicate the start of a word. Likewise, for 14 bit representations of words sent over line 17, flag bit generator attaches a flag bit at the start of that 14 bit representation to signify the start of a new word.

The unique representation for each inputted word with a flag bit attached is then input to control logic 21. At this point, the unique representation can either be sent to storage 22, transmission network 23, or output device 36 via line 25. Word representations sent to storage 22 may be retrieved for later editing and/or deletion. By optimizing the vocabulary set to a given user, the number of words represented by 14 bit representations is maximized. By doing this, storage 22 can accommodate a larger number of words than it could if each word were coded by each of the characters making up that word. Thus, the costs of storage per given word is dramatically decreased.

Each word input to control logic 21 may also be directed to transmission network 23 for transmission to another information processing system 24. By optimizing the word table to a given user, the speed at which the user can communicate with another information processing system 24 is increased. This increased speed is due to the decrease of the number of bits that must be transmitted from one system to another.

A third option that may occur when an inputted word representation is received by control logic 21 is for the representation to be decoded into the word which it represents and displayed to the user. As previously disclosed, output device 36 may be a printer, a CRT display, or a plasma display. The unique representation for a word is input over line 25 to flag bit detector 26. Flag bit detector 26 detects a flag bit and hence the start of a word. When a word has been detected, a signal is sent to bit counter 27 to indicate that the next stream of data sent represents a word. When this bit stream is input to bit counter 27, the number of bits are counted. A decision circuit (not shown) within bit counter 27 directs the bit stream to the appropriate line according to the number of bits input to the bit counter 27. When the number of bits is equal to 14, the bit stream is input over line 29 to decoder 32. However, if the number of bits contained in the bit stream is not equal to 14, then this is an indication that the representation for that particular word has been character coded. When this occurs, the serial bit stream representing that greater than 14 bit bit word is input over line 28 to deserializer 31. Deserializer 31 breaks up the bit stream into 14 bit packets and outputs them one packet at a time over line 30 to decoder 32.

Figure 5:
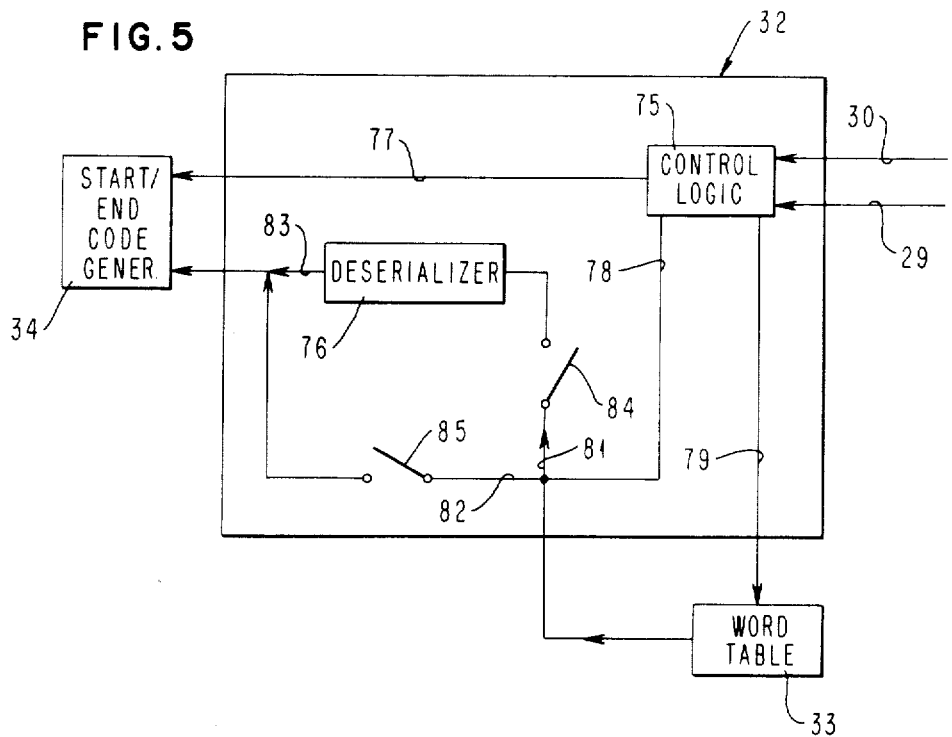
FIG. 5. is a detailed block diagram of the decoder used in the decoding portion of the system.

The operation of decoder 32 and word table 33 will now be detailed with reference to FIG. 5.

Data input over line 30 to control logic 75 is in the form of 14 bit representations of the individual characters in a word. Data input over line 29 to control logic 75 is in the form of 14 bit representations representing whole words. When the first 14 bit packet is received by control logic 75 over line 30, a signal is sent over line 77 to start/end code generator 34 to indicate the start of a word. The word table matches each 14 bit representation with the 7 bit ASCII representation that is compatible with the output device. As each 14 bit character representation is identified, the 7 bit ASCII code is sent over line 82 to start/end code generator 34. When the last 14 bit packet, representing the last character in a word, is received by control logic 75, then a signal is sent over line 77 to start/end code generator 34 signifying that the last character in the word has been received. In this manner, a start and stop bit can be attached to the ASCII code representation given to each word input over line 30 to comparator 32. This ASCII code representation will be in the form of 7 bits times the number of characters in the word.

Data input over line 29 to control logic 75 is in the form of 14 bit representations of whole words. When each 14 bit representation is received by control logic 75 over line 29, a signal is sent over line 77 to start/end code generator 34 to signify the receipt of a new word. A second signal is sent at a predetermined time after the first one over line 77 to signify the end of a word received by control logic 75 from line 29. The 14 bit representation received over line 29 by control logic 75 is then directed over line 79 to word table 33. Word table 33 then matches the incoming 14 bit word representation to its 7 bit code ASCII representation. The ASCII code representation is then output over line 81 to deserializer 76. Deserializer 76 then breaks the ASCII code representation for that particular word into 7 bit packets representing the individual characters in the word. The 7 bit ASCII code packets are then sent over line 83 to start/end code generator 34. Start/end code generator has already been signaled over line 77 that a word is to be decoded and input to the generator. A starting bit is then attached before the first character code representation for that particular word, and an ending bit is attached after the last 7 bit ASCII code representation for the last character in that word.

Control logic 75 also acts to direct the output of word table 33 to either line 81 or line 82 depending on whether the word input to decoder 32 comes over line 30 or line 29. Once again, words coming over line 30 indicate words coming in a character at a time. In these cases, control logic 75 sends a signal over line 78 to open switch 84 and close switch 85 so that the output from word table 33 will travel over line 82 rather than over line 81. Switch 84 is normally in the closed position. Switch 85 will remain open only long enough for the word to be sent over line 82. In those cases where the input to decoder 32 is over line 29, thus signifying a whole word representation being input to decoder 32, switch 84 is already closed and the word will be sent over line 81.

After each word representation has been decoded into the ASCII code representation for each character of the word and had a start and end bit attached to that ASCII code representation for the complete word, then the data is sent to output device 36 via start/end code detector 35. Start/end code detector 35 distinguishes whole words so that the output device may generate the alphanumeric representation of the ASCII code representation. As previously indicated, output device 36 may be a printer, or a display.

The selection of word code representations in word table 15 is entirely arbitary. The representations are not dependent on either alphanumeric content or alphanumeric order. The words in table 15 are not composed of any mathematical addition or arrangement of the codes of the individual characters making up a word. This assignment method assures that words having identical alphanumeric content, but differing alphanumeric order will not be confused in the system. The word code representations in table 33 are made identical to those in table 15.

The choice of 14 bits per word used herein is for purposes of illustration only. A system such as described herein would not be limited to unique unitary representations of 14 bits per word. Any suitable choice of bits per word could be used. In addition, other well known coding schemes such as Huffman coding and word occurrence frequency coding could be utilized in a system employing the present invention.

While the invention has been particularly shown and described with reference to the preferred embodiment herein, it will be understood by those skilled in the art that the foregoing and other changes in form and detail will be made therein without departing from the spirit and scope of the invention.

I claim:

1. An information processing system comprising:
   means for inputting alphanumeric words into the system, said alphanumeric words comprising serial aggregations of coded representations with a coded representation for each character in said alphanumeric words;
   encoding means for matching each of said inputted alphanumeric words with a unique predetermined unitary representation which is independent of any reordering of the serial aggregations of the coded representations comprising an inputted alphanumeric word, said encoding means sequentially examining each coded representation for the characters in an inputted word and branching to a unique location in a tree search logic for each character, each said unique location containing a unique predetermined unitary representation, said encoding means outputting the unique predetermined unitary representation reached after sequentially examining an entire inputted word; and
   control logic means for directing such unique unitary representation in place of its corresponding alphanumeric word to a word processing apparatus.

2. An information processing system comprising:
   means for inputting alphanumeric words into the system, said alphanumeric words comprising serial aggregations of coded representations with a coded representation for each character in said alphanumeric words;
   encoding means for matching each of said inputted alphanumeric words with a unique predetermined unitary representation which is independent of any reordering of the serial aggregations of the coded representations comprising an inputted alphanumeric word, said encoding means further comprising,
   first means for storing a predetermined vocabulary set containing a first list of alphanumeric words along with a second list of unique unitary representations corresponding to each alphanumeric word.
   second means for comparing the alphanumeric words in said first list against each alphanumeric word input to the system,
   third means governed by said second means for outputting from said second list a unique unitary representation corresponding to an alphanumeric word subsequent to a match occurring in said second means between such representation and such word and, fourth means for assigning a flag bit to each outputted unique unitary representation to identify the start of a unique unitary representation; and control logic means for directing such unique unitary representation in place of its corresponding alphanumeric word to a word processing apparatus.

3. An information processing system comprising:

means for inputting alphanumeric words into the system, said alphanumeric words comprising serial aggregations of coded representations with a coded representation for each character in said alphanumeric words;

encoding means for matching each of said inputted alphanumeric words with a unique predetermined unitary representation which is independent of any reordering of the serial aggregations of the coded representations comprising an inputted alphanumeric word, said encoding means further comprising, first means for storing a predetermined vocabulary set containing a first list of alphanumeric words along with a second list of unique unitary representations corresponding to the alphanumeric words in said first list, said predetermined vocabulary set also containing a third list of alphanumeric characters along with a fourth list of unique unitary representations corresponding to the alphanumeric characters in said third list, second means for comparing the alphanumeric words in said first list against each alphanumeric word input to the system, third means for comparing the alphanumeric characters in said third list against each alphanumeric character within each alphanumeric word input to the system, fourth means governed by said second means for outputting from said second list a unique unitary representation corresponding to an alphanumeric word subsequent to a match occurring in said second means between such representation and such word, fifth means governed by said third means for outputting from said fourth list a unique unitary representation corresponding to each alphanumeric character within each inputted alphanumeric word subsequent to no match occurring in said second means and a match occurring in said third means between such representation and such character, sixth means connected to said fifth means for serially aggregating said unique unitary representations from said fifth means, whereby each of said serial aggregations represent an inputted alphanumeric word and, seventh means for assigning a flag bit to each of said outputted unique unitary representations from said fourth means and to each of said serial aggregations outputted from said sixth means, whereby the start of each word representation is identified; and control logic means for directing such unique unitary representation in place of its corresponding alphanumeric word to a word processing apparatus.

* * * * *